US006523678B2

(12) United States Patent
Roessler et al.

(10) Patent No.: US 6,523,678 B2
(45) Date of Patent: Feb. 25, 2003

(54) CONVEYOR PULLEY WITH QUICK-CHANGE FEATURES

(75) Inventors: David A. Roessler, Hartland, WI (US); Kevin C. Rorke, Colorado Springs, CO (US); Anthony J. Stelter, Oconomowoc, WI (US); Frederick H. Thimmel, Hartland, WI (US)

(73) Assignee: Bryant Products, Inc., Ixonia, WI (US)

( * ) Notice: Subject to any disclaimer, the term of this patent is extended or adjusted under 35 U.S.C. 154(b) by 0 days.

(21) Appl. No.: 09/781,784

(22) Filed: Feb. 12, 2001

(65) Prior Publication Data

US 2002/0108841 A1 Aug. 15, 2002

(51) Int. Cl.[7] .......................... B65G 13/02; B65G 23/04
(52) U.S. Cl. ........................ 198/835; 198/780
(58) Field of Search .................. 198/780, 781.01, 198/835, 842; 193/35 R, 37

(56) References Cited

U.S. PATENT DOCUMENTS

| | | | |
|---|---|---|---|
| 1,611,176 A | 12/1926 | Fekete | |
| 1,687,442 A | 10/1928 | Hardley | |
| 1,983,845 A | 12/1934 | Evenburgh | |
| 2,188,953 A | 2/1940 | Mitchell | |
| 2,711,299 A | 6/1955 | Dugle | |
| 2,730,222 A | 1/1956 | Klein | |
| 3,122,945 A | 3/1964 | Chung | |
| 3,942,338 A | 3/1976 | Furlette et al. | |
| 4,034,837 A | * 7/1977 | Vinarcsik et al. | 193/37 |
| 4,169,530 A | 10/1979 | Fryatt | |
| 4,920,627 A | * 5/1990 | Aikins et al. | 29/402.08 |
| 5,025,916 A | 6/1991 | Kaminski | |
| 5,048,661 A | * 9/1991 | Toye | 193/35 R |
| 5,119,924 A | 6/1992 | Kaminski | |
| 5,170,547 A | * 12/1992 | Nikulainen et al. | 492/53 |
| 5,282,532 A | 2/1994 | Thomas, Sr. | |
| 5,449,063 A | 9/1995 | Thomas, Sr. | |
| 5,452,791 A | 9/1995 | Morency et al. | |
| 5,501,235 A | 3/1996 | Watanabe | |
| 5,547,448 A | * 8/1996 | Robertson | 492/16 |
| 5,927,479 A | 7/1999 | Merten et al. | |
| 6,000,531 A | 12/1999 | Martin | |
| 6,076,820 A | 6/2000 | Nagai et al. | |
| 6,082,528 A | * 7/2000 | Habberley | 198/842 |
| 6,202,557 B1 | * 3/2001 | Kustermann | 101/376 |

* cited by examiner

Primary Examiner—Christopher P. Ellis
Assistant Examiner—Gene O. Crawford
(74) Attorney, Agent, or Firm—Jansson, Shupe & Munger Ltd.

(57) ABSTRACT

A conveyor pulley is configured to revolve about an axis of rotation and includes a cylindrical shell and first and second bushing portions supported within the shell. First and second shaft portions are in torque-transmitting engagement with the first and second bushing portions, respectively. Such first and second shaft portions are restrained from axial movement with respect to the first and second bushing portions, respectively, and the first and second shaft portions are spaced from one another. For repair, the shaft portions and related bearings are independently removable without removing the entire pulley from the conveyor system.

20 Claims, 4 Drawing Sheets

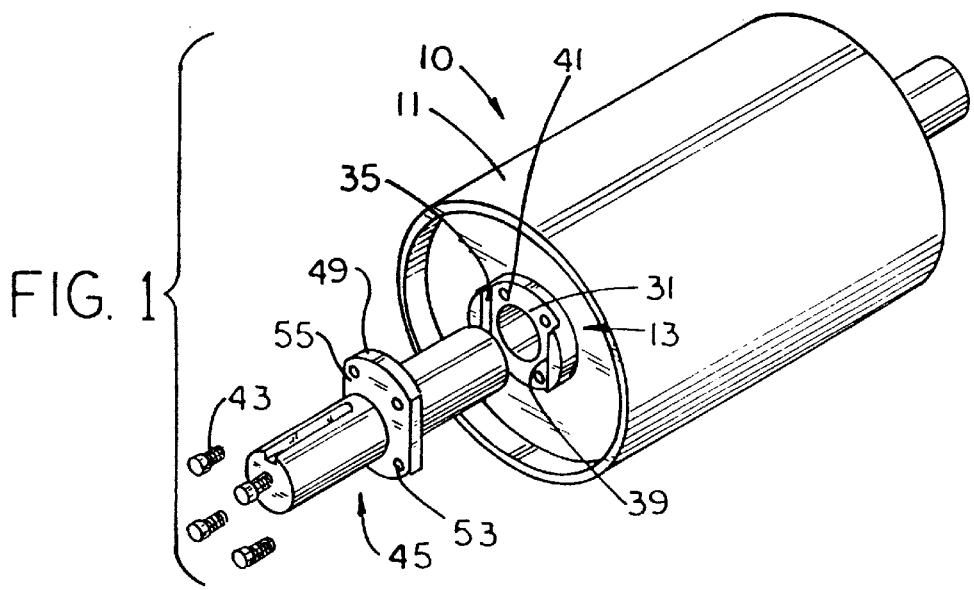
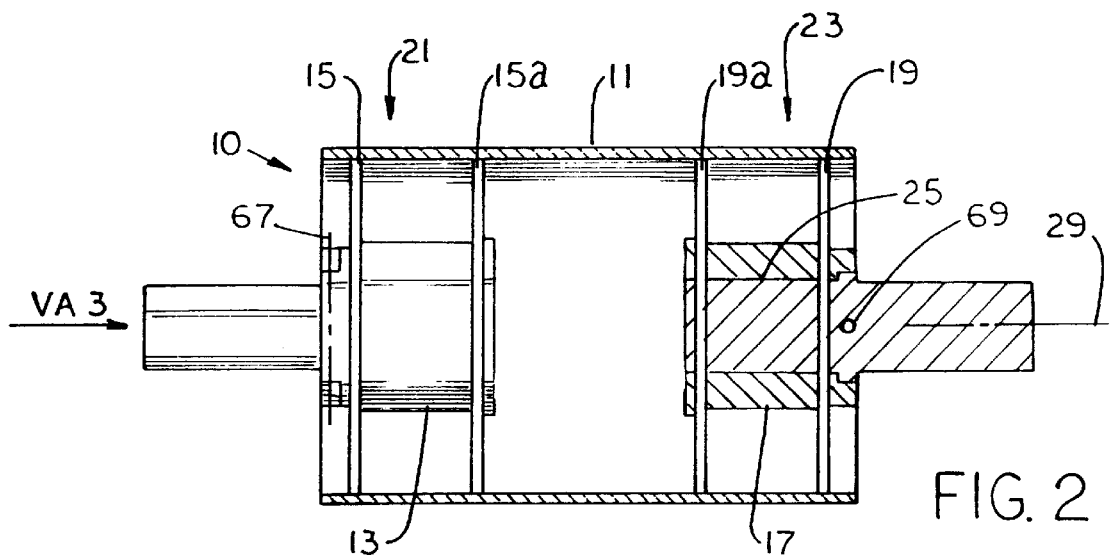
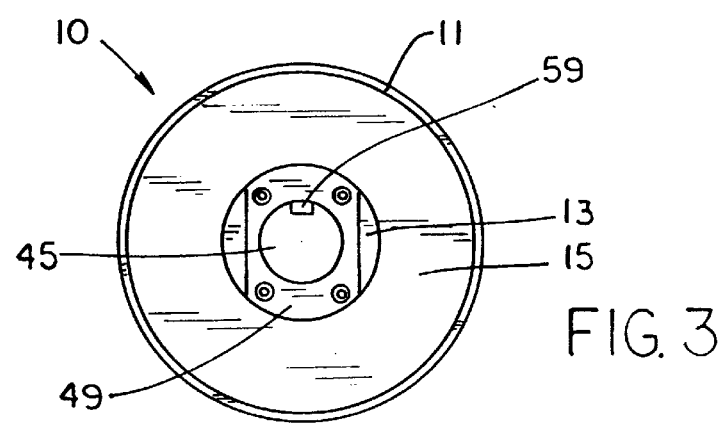

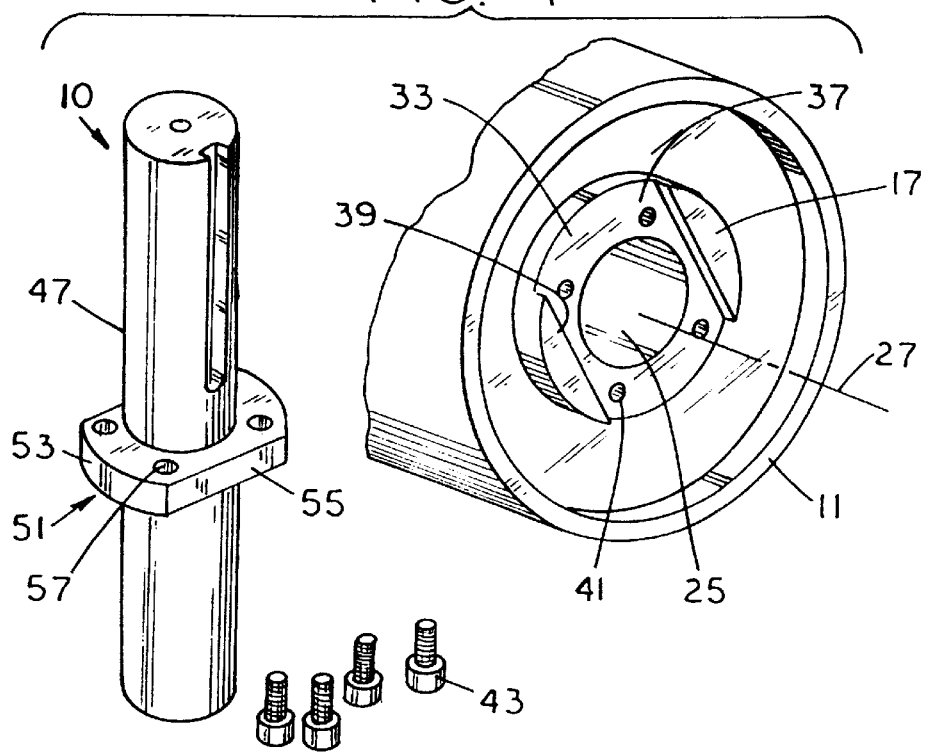
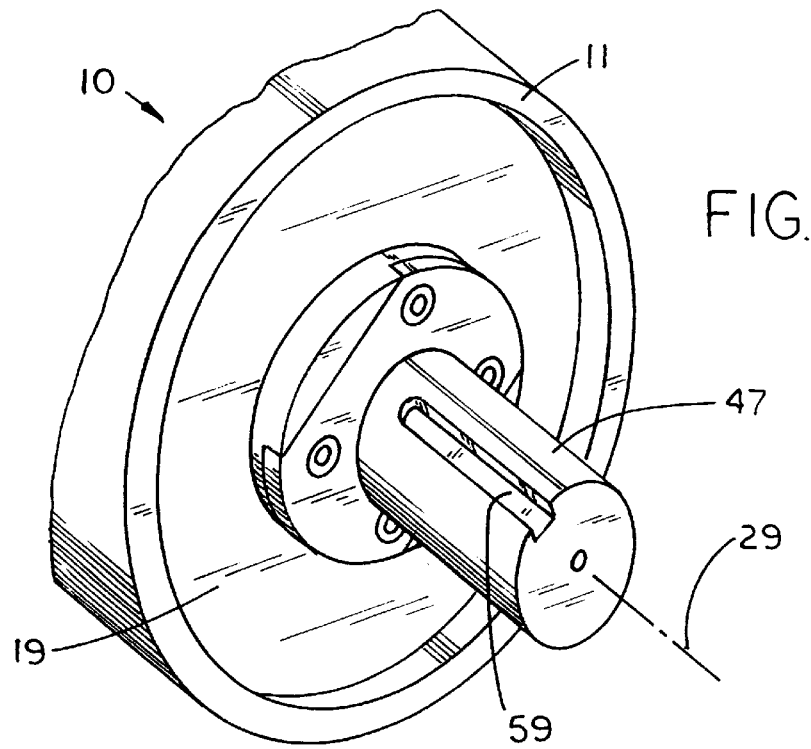

CONVEYOR PULLEY WITH QUICK-CHANGE FEATURES

FIELD OF THE INVENTION

The invention relates generally to power transmission systems of the endless belt type and, more particularly, to such systems having powered and idler pulleys as components thereof

BACKGROUND OF THE INVENTION

A typical endless-belt conveyor system has a head or driving pulley and a tail or idler pulley. Also typically, the axes of rotation of such pulleys are generally parallel to one another and horizontal, although neither parameter is an absolute requirement. An endless belt is mounted on and supported by such pulleys and, when viewed toward the belt edge, such belt defines what might be described as a very-elongate race track shape. The top portion of the belt is driven by the head pulley and is in tension. The lower portion may be somewhat slack.

Endless-belt conveyor systems are used for a wide variety of purposes. An example is a conveyor system moving granular or containerized products from one location to another. Another example, used in a commercial airport, moves passenger baggage from the baggage cart offloading area to the carousels at which passengers retrieve such baggage.

In conventional arrangements, a pulley (head or tail) has a one-piece shaft extending entirely through the pulley. Such shaft protrudes from either side by dimensions sufficient to mount the shaft ends on respective supporting bearings and (in the case of a powered head pulley) to apply driving torque to one end. An example of a type of conveyor having a narrow pulley and a through shaft is disclosed in U.S. Pat. No. 6,000,531 (Martin).

Like all mechanical structures, such conveyor systems experience failure, e.g., bearing failure, from time to time. And, often, the shaft supported by such bearing is damaged so as to require replacement. In a conventional system, the failure of a bearing requires that the pulley be entirely removed from the conveyor structure. This is so since the pulley shaft is a one-piece shaft. And it is highly desirable to leave the belt in place while effecting repairs. Often, the pulley is removed to another site for repair or substitution.

This is time consuming and runs the risk of damaging the pulley outer shell during handling. And when re-installed, the pulley outer shell, replacement shaft and other components must be precisely concentrically aligned or the pulley will "wobble", result in undue belt wear and unduly stress the bearings.

And that is not all. A pulley is very heavy, difficult to handle and, therefore, difficult to re-align and mount following repair. If the conveyor system (including the failed pulley) is closely adjacent to another conveyor system (as is common in airport baggage handling arrangements) or to some other obstruction, the difficulty of repair is exacerbated. The system having the failed pulley (or the adjacent work-impeding structure) may have to be elevated with jacks in order to get at and remove the affected pulley, shaft and bearing.

An improved conveyor roller which addresses problems of known pulleys would be an important advance in the art.

OBJECTS OF THE INVENTION

It is an object of the invention to provide a conveyor pulley overcoming some of the problems and shortcomings of prior art pulleys.

Another object of the invention is to provide a conveyor pulley which is easy to replace.

Another object of the invention is to provide a conveyor pulley configured to permit bearing or shaft replacement while yet avoiding removal of the pulley from the conveyor system.

Still another object of the invention is to provide a conveyor pulley which is less costly to repair that known pulleys.

Yet another object of the invention is to provide a conveyor pulley which may be readily serviced, notwithstanding the proximity of other equipment or of an obstruction.

Another object of the invention is to provide a conveyor pulley which, when compared to a similar prior art pulley, is lighter in weight. How these and other objects are accomplished will become apparent from the following descriptions and the drawings.

SUMMARY OF THE INVENTION

The new conveyor pulley is configured to revolve about an axis of rotation. Such pulley includes a cylindrical drum or shell and first and second bushing portions supported within the shell. A first shaft portion is in torque-transmitting engagement with the first bushing portion; and a second shaft portion is in torque-transmitting engagement with the second bushing portion.

The first and second shaft portions are restrained from axial movement with respect to the first and second bushing portions, respectively. In a specific embodiment, such restraint is provided by fasteners coupling a shaft portion and its respective bushing portion to one another. The first and second shaft portions are spaced from one another, that is, such shaft portions are separate components independently replaceable.

In a highly preferred embodiment, the first shaft portion includes a flange (a "first" flange) which might be described as "race track shaped". Such flange has a pair of arcuate ends (of the same radius of curvature) which are joined by a pair of linear sides. The first bushing portion includes a "first" face and the first shaft portion is restrained by at least one fastener—a "first" fastener—and, preferably, by plural fasteners such as cap screws which engage the flange and the face.

In other aspects of the inventive pulley, the first bushing portion includes a groove having at least one linear edge and extending along a groove axis. Such axis is generally perpendicular to the axis of rotation. The flange is received in the groove and bears against the edge. Considered another way, the groove and the flange are conformably shaped and sized in such a way that the flange may be fitted into the groove with closely-fitted sliding clearance so as to avoid rotational "play" between the shaft portion and bushing portion. The first bushing portion and first shaft portion are at one end of the pulley, the other end is similarly configured in that such end is substantially a "mirror image" of the first end.

More specifically, the second bushing portion includes a second face, the second shaft portion includes a second flange and the second shaft portion is restrained by at least a second fastener engaging the second flange and the second face. Most preferably, the second shaft portion and the second bushing portion are secured to one another by plural fasteners.

In other aspects of the inventive pulley, a first support structure is interposed between the shell and the first bushing portion. Similarly, a second support structure interposed between the shell and the second bushing portion. Such support structures retain, respectively, the first and second bushing portions in fixed positions with respect to the shell. While such support structures may be configured as "spiders", support rods or the like, in a highly preferred embodiment, the first and second support structures include, respectively, annular members. Each annular member is affixed to the shell and to its respective bushing portion by welding, for example. Most preferably, each support structure comprises a pair of spaced-apart annular webs affixed to the shell and respective bushing portions. A preferred web is "washer like" and disc-shaped.

While it is preferred to construct the new pulley with two spaced-apart bushing portions (as separate pieces secured within the pulley shell), that is not the only way to construct an operative pulley although it may be the lowest-cost configuration consistent with the required rigidity, "robustness" and the like. In an alternate embodiment, the pulley includes a single bushing tube extending along the pulley axis of rotation. Such tube has first and second ends, the first shaft portion terminates at the first end and the second shaft portion terminates at the second end.

In the embodiments described, the shell, shaft portions and bushing portions are all concentric with the pulley axis of rotation. The shaft portions are independently removable from their respective bushing portions and, most preferably, a particular shaft portion and its mating bushing portion are in torque-transmitting engagement with one another. Even if shaft portions were configured to have a length causing such portions to actually touch one another inside the shell, this is not the preferred arrangement. Such shaft portions are considered to be "spaced" from one another, even if only minutely, and of course would be independently removable, a feature of the invention.

Other aspects of the invention involve a method for repairing a conveyor structure. Such structure has a driven or head pulley and an idler or tail pulley. Each pulley includes first and second stub shafts axially spaced from one another and supported by first and second bearings, respectively. It is assumed that one of the pulleys has failed by, e.g., having one of the bearing seize. With such a seizure, there is a high likelihood that the shaft portion supported by such bearing is also damaged and should be replaced.

The method includes the steps of determining that the failure is associated with, for example, the first shaft and the first bearing of the head pulley. The first bearing is detached from the structure and the head pulley first stub shaft is removed therefrom. A new stub shaft and/or new first bearing are attached and/or mounted, the new stub shaft being installed in place of the first stub shaft. The structure is then re-assembled.

A typical conveyor structure includes a pair of spaced-apart frame members. When the conveyor is operating, the pulleys are supported between the frame members (i.e., laterally between such members or somewhat above but yet between them). In a highly preferred method, the detaching step is carried out while supporting the head pulley between the frame members. Similarly, the removing step is carried out while supporting the head pulley between the frame members.

In the alternative, it is assumed that the failure is associated with the first shaft and the first bearing of the tail pulley. The tail pulley first bearing is detached from the structure; the tail pulley first stub shaft is removed from the tail pulley and a new stub shaft is attached in place of the first stub shaft of the tail pulley. Then the structure is re-assembled.

As with a failure associated with the head pulley, the detaching step is carried out while supporting the tail pulley between the frame members. And, most preferably, the removing step is also carried out while supporting the tail pulley between the frame members.

From the foregoing and from the detailed description which follows, advantages of the new pulley will be apparent. One no longer need remove the entire pulley to another location to effect repair. Such repair can be carried out while simply supporting the affected pulley substantially "in place" and replacing bearing(s) and/or shaft portion(s) as needed.

BRIEF DESCRIPTION OF THE DRAWINGS

FIG. 1 is a partially-exploded view of the inventive conveyor pulley.

FIG. 2 is a cross-sectional view of the pulley of FIG. 1 when fully assembled. Some parts are shown in full representation.

FIG. 3 is an end elevation view of the pulley of FIG. 2 taken along the viewing axis VA3 thereof.

FIG. 4 is a perspective view of one end of the inventive pulley, together with a shaft portion and fasteners disassembled from such end. Parts are broken away.

FIG. 5 is a perspective view of the pulley end of FIG. 4 with the shaft portion and fasteners assembled thereto.

DETAILED DESCRIPTION OF PREFERRED EMBODIMENTS

Figure 8:
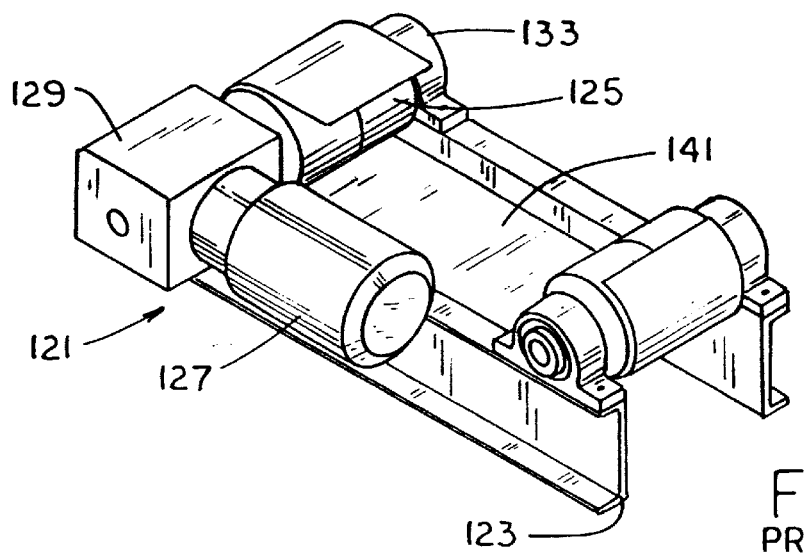
FIG. 8 is a perspective view of a prior art conveyor structure.
Figure 9:
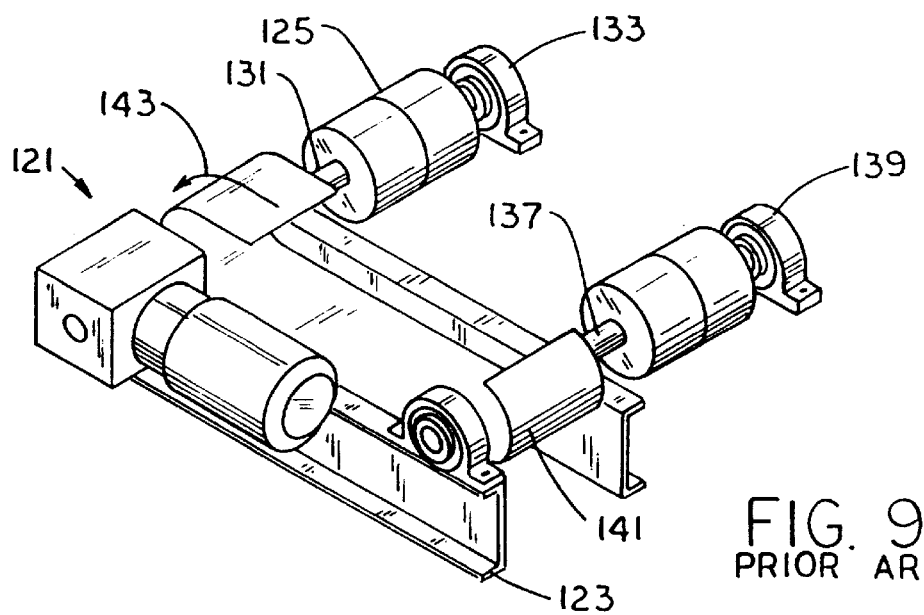
FIG. 9 is a partially-exploded perspective view of the conveyor structure of FIG. 8.
Figure 10:
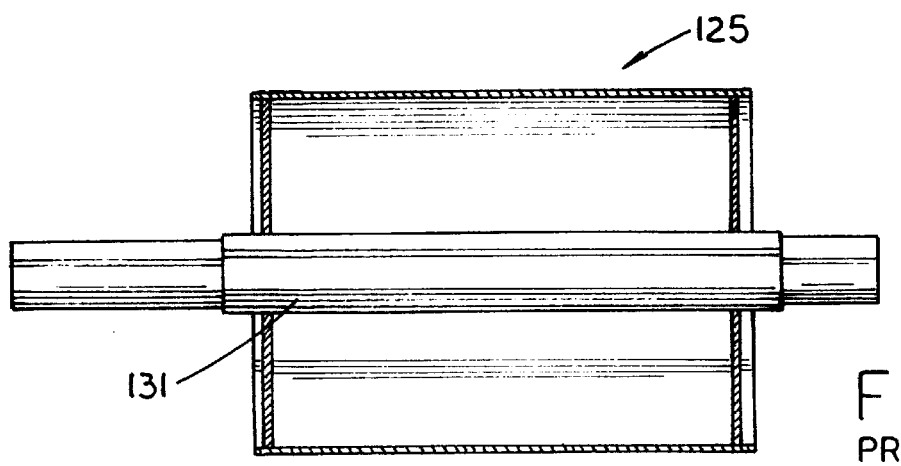
FIG. 10 is a cross-sectional view of a prior art conveyor pulley. The one-piece shaft is shown in full representation.

Before describing the inventive conveyor pulley 10 and an associated system, it will be helpful (in appreciating the advantages of the new pulley 10) to have an understanding of how an exemplary prior art conveyor pulley and conveyor system are configured. Referring to FIGS. 8, 9 and 10, a prior art conveyor structure 121 includes a frame 123 supporting a head pulley 125 driven by an electric motor 127 and an intervening speed reducer 129. The one-piece pulley shaft 131 is supported on bearings 133. Similarly, the structure frame 123 supports a tail pulley 135, the one-piece shaft 137 of which is supported for rotation by bearings 139. While FIG. 10 shows the head pulley 125, both pulleys 125, 135 are similarly configured.

A belt 141 is wrapped around the pulleys 125, 135 and is powered by the pulley 125 in the direction indicated by the arrow 143. Thus, the upper part of the belt 141 is in tension while the lower part may be somewhat slack.

If a bearing, e.g., the bearing 133, fails, the bearing assembly must be removed from the frame 123 and the entire pulley 125 including its shaft 131 withdrawn laterally away from the belt 141. There is a good likelihood that such pulley 125 and shaft 131 must be transported to a service site for repair. Either the repaired pulley 125 and shaft 131 or a replacement must be brought to the structure 121 and, together with the bearing 133 if it has failed, re-installed. The implications for extended downtime and consequent repair cost are apparent.

Referring now to FIGS. 1 through 5, details of the new pulley 10 will be set forth. Such pulley 10 includes an outer cylindrical shell 11 made of steel or some other material selected to withstand the rigors of conveyor service. A generally-cylindrical first bushing (or sleeve) portion 13 is supported concentrically within the shell 11 by at least one annular web 15 and, most preferably, by a pair of spaced-apart annular webs 15, 15a. Each web 15, 15a is "washer-like" and is welded to both the shell 11 and the portion 13.

Similarly, the pulley 10 includes a generally-cylindrical second bushing (or sleeve) portion 17 supported concentrically within the shell 11 by at least one web 19, and preferably by two spaced-apart annular webs 19, 19a. Such webs 19, 19a are similarly welded to the shell 11 and to the second bushing portion 17. The webs 15, 15a and the webs 19, 19a form first and second support structures 21, 23, respectively. (A single web such as webs 15, 19, may be used as a support structure but concentricity of the bushing portions 13, 17 and sturdiness of the pulley 10 will be better maintained by using two webs per portion 13, 17.

Each bushing portion 13, 17 has a cylindrical inner cavity 25, the axis 27 of which is coincident with the axis of rotation 29 of the pulley 10. Referring particularly to FIGS. 1 and 4, each of the outer ends of the bushing portions 13, 17 has a substantially planar face (first and second faces 31, 33, respectively) and each of such faces defines the "floor" of one of first and second grooves 35, 37, respectively. The edges 39 of each groove 35, 37 are substantially flat and linear. Each face 31, 33 includes drilled and tapped holes 41 for receiving threaded fasteners 43 described below.

The pulley 10 also includes first and second shaft portions 45, 47, respectively. Such shaft portions 45, 47 have, respectively, first and second flanges 49, 51, each defined by curved edges 53 having the same radius of curvature and being "joined" by the edges 55. The grooves 35, 37 and the respective flanges 49, 51 are conformably shaped so that a flange fits into its respective groove with slight sliding clearance. It is apparent from the foregoing that so long as a flange is retained in its groove, torque may be transmitted from a shaft portion, e.g., portion 45, to the pulley shell 11. To help assure such retention, at least one fastener 43 and preferably plural fasteners 43 are inserted through openings 57 in the flanges 49, 51 and threaded into the holes 41 in the respective faces 31, 33. Only one of several advantages of the preferred embodiment is that the shaft portions 45, 47 may be replaced independently.

When the pulley 10 is configured as shown and described, the fasteners 43 are not subjected to torque; they only serve to keep a shaft portion (e.g., portion 45) and its respective bushing portion (e.g., portion 13) engaged with one another. However, a shaft portion and a bushing portion may be in torque-transmitting engagement with one another by using only fasteners, i.e., without using torque-transmitting shapes such as the aforedescribed grooves 35, 37 and flanges 49, 51. However, such an arrangement places the fasteners in shear and may result in premature failure.

It is to be understood that the fasteners 43 need not be threaded fasteners. Substantially any type of fastener which will secure a bushing portion 13, 17, and its respective shaft portion 45, 47, in compression will be, satisfactory.

Figure 6:
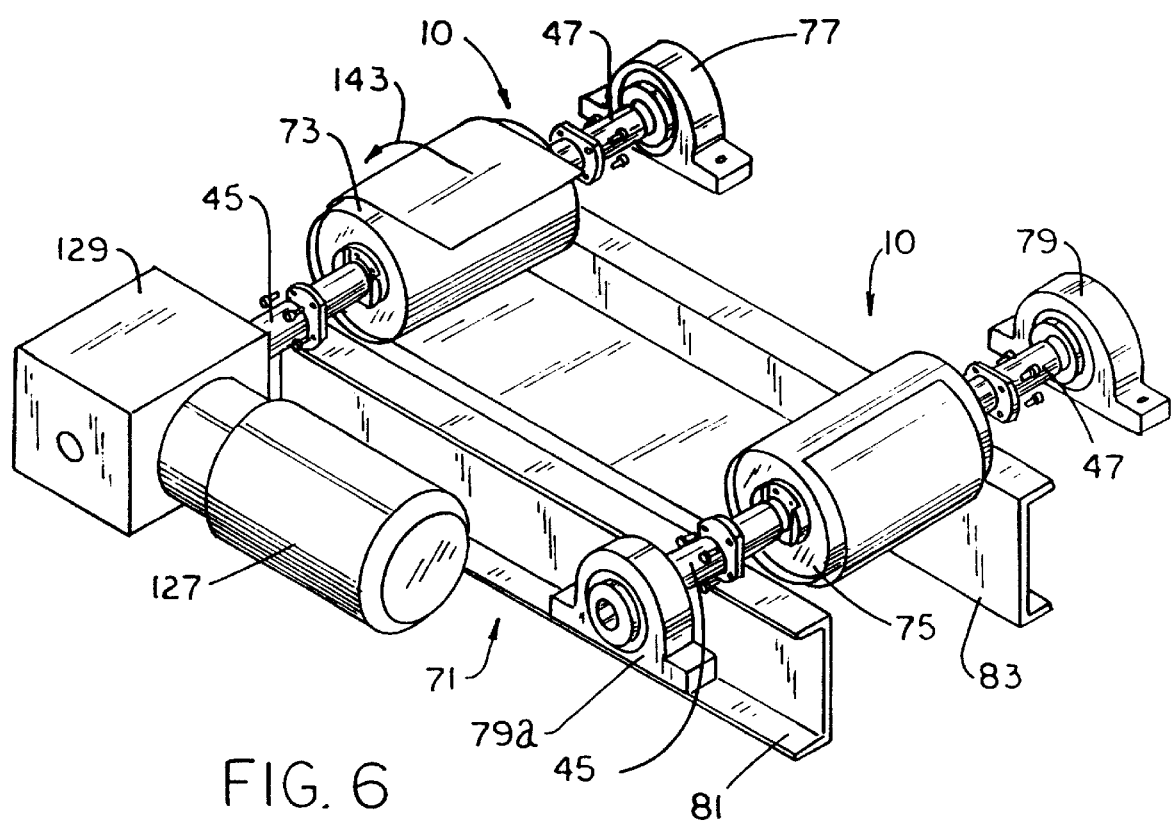
FIG. 6 is a partially-exploded perspective view of a conveyor structure incorporating the inventive pulley. Parts are broken away.

It should also be noted that, considering FIG. 6, only one of the two shaft portions, e.g., portion 45, is driven by the motor 127 and speed reducer 129. The other shaft portion, e.g., portion 47, could well be retained in engagement with its bushing portion 17 solely by fasteners 43. However, there are manufacturing and repair advantages to using shaft portions 45, 47 and bushing portions 13, 17 which, but for the presence of a keyway 59 on the driven shaft portion 45 and the absence of a keyway 59 on the "idler" shaft portion 47, are common to both sides of the pulley 10. (In FIG. 5, the portion 47 is shown to have a keyway 59 to illustrate the fact that in an emergency, a keyed shaft portion may be used as an idler shaft portion.)

Figure 7:
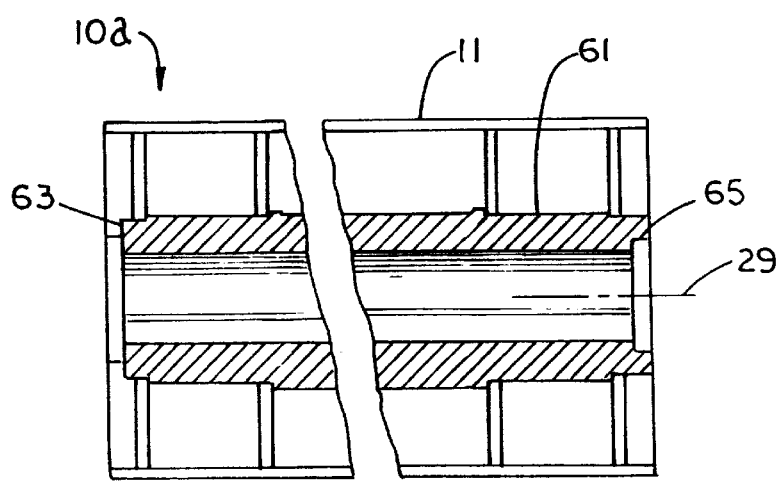
FIG. 7 is a cross-sectional view of an alternate embodiment of the inventive pulley.

While it is preferred to construct the new pulley 10 with two spaced-apart bushing portions 13, 17 (as separate pieces secured within the pulley shell 11), that is not the only way to construct an operative pulley 10 although it may be the lowest-cost configuration consistent with the required rigidity, "robustness" and the like. In an alternate embodiment shown in FIG. 7, the pulley 10a includes a single bushing tube 61 extending along the pulley axis of rotation 29. Such tube 61 has first and second ends 63, 65 respectively, the first shaft portion 45 would be attached at the first end 63 and the second shaft portion 47 would be attached at the second end 65.

In the embodiments described, the shell 11, shaft portions 45, 47 and bushing portions 13, 17 are all concentric with the pulley axis of rotation 29. The shaft portions 45, 47 are independently removable from their respective bushing portions 13, 17 and, most preferably, a particular shaft portion (e.g., portion 45) and its mating bushing portion (e.g., portion 13) are in torque-transmitting engagement with one another. Even if shaft portions 45, 47 were configured to have a length causing such portions 45, 47 to actually touch one another inside the shell 11, this is not the preferred arrangement. Such shaft portions 45, 47 would nevertheless be "spaced" from one another, even if only minutely, and of course would be independently removable, an important feature of the invention.

In the pulley 10 depicted in FIG. 2, the long axis 67 of the flange 49 of the shaft portion 45 is vertical while the long axis 69 of the flange 51 of the shaft portion 47 is horizontal. (One might say that the axis 67 is parallel to the drawing sheet and the axis 69 is into and out of the sheet.) Considered another way, the shaft portions 45, 47 are rotated 90 degrees with respect to one another. It is to be understood that such depiction is arbitrary; the shaft portions 45, 47 (and respective bushing portions 13, 17) can assume any rotational positions relative to one another.

Referring to FIGS. 1 through 6 and especially to FIG. 6, other aspects of the invention involve a method for repairing a conveyor structure 71. Such structure 71 has a driven or head pulley 73 and an idler or tail pulley 75. Each pulley 73, 75 includes first and second stub shaft portions 45, 47 axially spaced from one another and supported by a first bearing (not shown) and a second bearing 77. It is assumed that one of the pulleys 73, 75 has failed by, e.g., having bearing 77, 79 seize. With such a seizure, there is a high likelihood that the shaft portion 45 or 47 supported by such bearing 77 or 79 is also damaged and will need to be replaced.

The method includes the steps of determining that the failure is associated with, for example, the second shaft portion 47 and the second bearing 77 of the head pulley 73. The second bearing 77 is detached from the structure 71 and the head pulley second stub shaft portion 47 is removed therefrom. A new stub shaft portion and/or new second bearing are attached and/or mounted, the new stub shaft portion being installed in place of the second stub shaft portion 47. The structure 71 is then re-assembled.

A typical conveyor structure 71 includes a pair of spaced-apart frame members 81, 83. When the conveyor is operating, the pulleys 73, 75 are supported between the frame members 81, 83, i.e., laterally between such members 81, 83 or somewhat above but yet between them as shown in FIG. 6. In a highly preferred method, the detaching step is carried out while supporting the head pulley 73 between the frame members 81, 83. (In an arrangement where the pulleys 73, 75 are supported laterally between the frame members 81, 83, the bearings 77, 79, 79a are mounted in pockets or openings (not shown) formed in such frame members 81, 83.) Similarly, the removing step is carried out while supporting the head pulley 73 between the frame members 81, 83.

In the alternative, it is assumed that the failure is associated with the first shaft portion 45 and the first bearing 79a of the tail pulley 75. The tail pulley 75 first bearing 79a is detached from the structure, the tail pulley first stub shaft portion 45 is removed from the tail pulley 75 and a new stub shaft portion is attached in place of the first stub shaft portion 45 of the tail pulley 75. Then the structure 71 is re-assembled.

As with a failure associated with the head pulley 73, the detaching step is carried out while supporting the tail pulley 75 between the frame members 81, 83. And, most preferably, the removing step is also carried out while supporting the tail pulley 75 between the frame members 81, 83.

From the foregoing, it is apparent that one no longer need remove the entire pulley 10 to another location to effect repair. Such repair can be carried out while simply supporting the affected pulley 10 substantially "in place" and replacing bearing(s) and/or shaft portion(s) as needed. To put it another way, the fact that the conveyor pulley 10 involves "close quarters" for working is no longer a significant factor in affecting repair.

As used herein, the phrase "torque-transmitting engagement" means that the members are engaged in such a way that torque may be transmitted from one to the other. In a highly preferred embodiment, such engagement is by a male flange 49 or 51 fitted into a conformably-shaped female groove 35 or 37 in a bushing portion 13 or 17. Torque may be transmitted by virtue of the fact that edges 55 of the flange 49 or 51 bear against groove edges 39. But other geometric shapes (except a circle) may also be used to transmit torque. For example, a hex-shaped pocket in a shaft portion 45 or 47 may mate with a hex-shaped boss formed on a bushing portion 13 or 17. In such configurations, the fasteners 43 only retain the shaft portion 45 or 47 and bushing portion 13 or 15 in compression engagement with one another; such fasteners 43 do not transmit torque. Thus, shear load on the fasteners 43 is essentially eliminated. However, torque-transmitting engagement also means engagement using only fasteners 43 but this is not preferred since such fasteners 43 will be put under shear load and may fail prematurely.

An industry publication defines a pulley as a usually-cylindrical member with provision for mounting on a shaft. The invention involves both powered and non-powered conveyor pulleys.

In the same publication, a roller is defined as a rotating element free to revolve about its outer surface. Rollers may form a component part of a roller chain, the rolling support for a chain and load being conveyed or the rotating element upon which a conveyor belt is carried.

While the principles of the invention have been shown and described in connection with specific embodiments, it is to be understood that such embodiments are by way of example and are not limiting.

What is claimed is:

1. A conveyor pulley configured to revolve about an axis of rotation and including:
   a cylindrical shell;
   first and second axially-spaced bushing portions supported within the shell;
   first and second support structures interposed between the shell and the first and second bushing portions, respectively, around and retaining the first and second bushing portions in fixed positions with respect to the shell, the support structures being affixed to the shell and to their respective bushing portion;
   a first shaft portion in torque-transmitting engagement with the first bushing portion; and
   a second shaft portion in torque-transmitting engagement with the second bushing portion, and wherein:
      the first shaft portion is restrained from axial movement with respect to the first bushing portion;
      the second shaft portion is restrained from axial movement with respect to the second bushing portion; and
      the first and second shaft portions are spaced from one another.

2. The pulley of claim 1 wherein the first and second support structures include, respectively, first and second annular members, each annular member being affixed to the shell and to its respective bushing portion and being of substantially smaller axial dimension than the bushing portion to which it is affixed.

3. The pulley of claim 1 wherein:
   the first support structure includes a first pair of annular webs spaced from one another, affixed to the shell and to the first bushing portion, and having a combined axial dimension smaller than the axial dimension of the first bushing portion; and
   the second support structure includes a second pair of annular webs spaced from one another, affixed to the shell and to the second bushing portion, and having a combined axial dimension smaller than the axial dimension of the second bushing portion.

4. The pulley of claim 1 wherein:
   the pulley includes a single bushing tube extending along the axis of rotation and having first and second ends;
   the first shaft portion terminates at the first end; and
   the second shaft portion terminates at the second end.

5. The pulley of claim 1 wherein:
   the first shaft portion includes a flange,
   the first bushing portion includes a face; and
   the first shaft portion is restrained by at least one fastener engaging the flange and the face.

6. The pulley of claim 5 wherein:
   the first bushing portion includes a groove having at least one linear edge and extending along a groove axis generally perpendicular to the axis of rotation; and
   the flange is received in the groove and bears against the edge.

7. The pulley of claim 6 wherein:
   the fastener is a first fastener, the flange is a first flange, and the face is a first face;
   the second bushing portion includes a second face;
   the second shaft portion includes a second flange; and
   the second shaft portion is restrained by at least a second fastener engaging the second flange and the second face.

8. A conveyor pulley including:
   an outer cylindrical shell extending along a pulley axis of rotation;
   first and second bushing portions concentric with the axis of rotation and spaced apart along such axis;
   first and second webs supporting, respectively, the first and second bushing portions within the shell;
   a first shaft portion affixed to the first bushing portion in torque-transmitting engagement therewith;
   a second shaft portion affixed to the second bushing portion in torque-transmitting engagement therewith; and wherein:
      the first and second shaft portions are spaced from one another and
      the first and second shaft portions are independently removable from the first and second bushing portions, respectively.

9. The pulley of claim 8 wherein:
   the first web is welded to the shell and to the first bushing portion; and the second web is welded to the shell and to the second bushing portion.

10. The pulley of claim 9 wherein:

the first bushing portion includes a first groove;

the first shaft portion includes a first flange received in the first groove;

the first bushing portion and the first shaft portion are axially secured to one another by a plurality of first fasteners;

the second bushing portion includes a second groove;

the second shaft portion includes a second flange, received in the second groove; and the second bushing portion and the second shaft portion are axially secured to one another by a plurality of second fasteners.

11. A method for repairing a conveyor structure having a pair of spaced-apart frame members, a driven head pulley and an idler tail pulley which, when the conveyor is operating are supported between the frame members, and wherein each pulley includes first and second stub shafts axially spaced from one another and supported by first and second bearings, respectively, and wherein one of the pulleys has failed, the method including the steps of:

determining that the failure is associated with the first shaft and the first bearing of one of the pulleys;

detaching the first bearing of such one pulley from the structure while supporting such one pulley between the frame members;

removing the first stub shaft of such one pulley from such one pulley;

attaching a new stub shaft in place of the first stub shaft; and re-assembling the structure.

12. The method of claim 11 wherein the removing step is carried out while supporting such one pulley between the frame members.

13. A conveyor pulley configured to revolve about an axis of rotation and including:

a cylindrical shell;

first and second bushing portions supported within the shell and including first and second bushings, respectively, spaced from one another along the axis of rotation;

first and second support structures interposed between the shell and the first and second bushing portions, respectively, and retaining the first and second bushing portions in fixed positions with respect to the shell, the first and second support structures including first and second annular members, respectively, each annular member being affixed to the shell and to its respective bushing portion;

a first shaft portion in torque-transmitting engagement with the first bushing portion; and a second shaft portion in torque-transmitting engagement with the second bushing portion, and wherein:

the first shaft portion is restrained from axial movement with respect to the first bushing portion;

the second shaft portion is restrained from axial movement with respect to the second bushing portion; and the first and second shaft portions are spaced from one another.

14. The pulley of claim 13 wherein:

the first shaft portion includes a flange;

the first bushing portion includes a face; and the first shaft portion is restrained by at least one fastener engaging the flange and the face.

15. The pulley of claim 14 wherein:

the first bushing portion includes a groove having at least one linear edge and extending along a groove axis generally perpendicular to the axis of rotation; and the flange is received in the groove and bears against the edge.

16. The pulley of claim 15 wherein:

the fastener is a first fastener, the flange is a first flange, and the face is a first face;

the second bushing portion includes a second face;

the second shaft portion includes a second flange; and the second shaft portion is restrained by at least a second fastener engaging the second flange and the second face.

17. A conveyor pulley configured to revolve about an axis of rotation and including:

a cylindrical shell;

first and second bushing portions supported within the shell and including first and second bushings, respectively, spaced from one another along the axis of rotation;

first and second support structures interposed between the shell and the first and second bushing portions, respectively, and retaining the first and second bushing portions in fixed positions with respect to the shell, the first and second support structures each including a pair of annular webs spaced from one another and affixed to the shell and to the respective bushing portion; and a first shaft portion in torque-transmitting engagement with the first bushing portion; and a second shaft portion in torque-transmitting engagement with the second bushing portion, and wherein:

the first shaft portion is restrained from axial movement with respect to the first bushing portion;

the second shaft portion is restrained from axial movement with respect to the second bushing portion; and the first and second shaft portions are spaced from one another.

18. The pulley of claim 17 wherein:

the first shaft portion includes a flange;

the first bushing portion includes a face; and the first shaft portion is restrained by at least one fastener engaging the flange and the face.

19. The pulley of claim 18 wherein:

the first bushing portion includes a groove having at least one linear edge and extending along a groove axis generally perpendicular to the axis of rotation; and the flange is received in the groove and bears against the edge.

20. The pulley of claim 19 wherein:

the fastener is a first fastener, the flange is a first flange, and the face is a first face;

the second bushing portion includes a second face;

the second shaft portion includes a second flange; and the second shaft portion is restrained by at least a second fastener engaging the second flange and the second face.

* * * * *